Dec. 16, 1930.  G. H. BUCHANAN  1,785,375
AMMONIUM PHOSPHATE FERTILIZER COMPOSITION
AND METHOD OF MAKING THE SAME
Filed Jan. 28, 1927
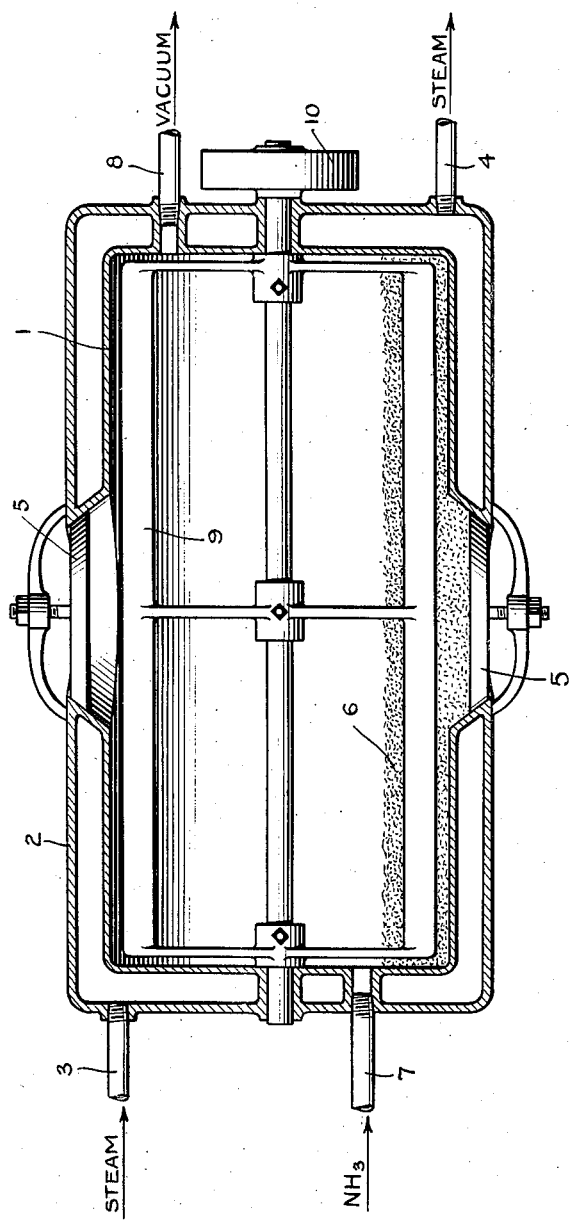
GUY H. BUCHANAN,
INVENTOR
ATTORNEY Patented Dec. 16, 1930

1,785,375

UNITED STATES PATENT OFFICE

GUY H. BUCHANAN, OF WESTFIELD, NEW JERSEY, ASSIGNOR TO AMERICAN CYANAMID COMPANY, OF NEW YORK, N. Y., A CORPORATION OF MAINE

AMMONIUM-PHOSPHATE FERTILIZER COMPOSITION AND METHOD OF MAKING THE SAME

Application filed January 28, 1927. Serial No. 164,345.

This invention relates to fertilizers, more particularly to concentrated fertilizers of the ammonium phosphate type.

The fertilizing value of ammonium phosphate has long been recognized and many tons of commercial mono-ammonium phosphate are consumed in the fertilizer industry annually. Pure mono-ammonium phosphate contains 14.8% ammonia and 61.7% $P_2O_5$ but the ordinary fertilizer grade of ammonium phosphate usually contains about 13% $NH_3$ and about 48% $P_2O_5$. In such material the ratio of ammonia to $P_2O_5$ is about 1 to 3.7. While this ratio is satisfactory for certain types of crop, there are others where a higher ratio of ammonia to $P_2O_5$ is desirable, consequently there is a demand for an ammonium phosphate containing a higher percentage of ammonia than the ordinary mono-ammonium salt.

Of the three hydrogen atoms of ortho phosphoric acid, the first exhibits the characteristics of a strong acid and yields a salt of satisfactory stability. The second hydrogen atom of phosphoric acid is considerably weaker and, when neutralized with ammonia, the ammonia is held more loosely than is the ammonia combined with the first hydrogen. However, this combination is still sufficiently stable to permit the manufacture, shipment and use in the fertilizer industry of di-ammonium phosphate. This is evidenced by experiments which I have conducted in which I have found that di-ammonium phosphate can be stored for periods at least as long as one year without appreciable ammonia loss. The third hydrogen atom of phosphoric acid is so weak that tri-ammonium phosphate is not suited for use in fertilizer manufacture owing to the ease with which it loses ammonia.

Some years ago a method was developed for the manufacture of di-ammonium phosphate on which patent application has been filed by me in the United States Patent Office, Serial No. 720,566, dated June 17, 1924. This process relates to the production of the salt by a crystallization process, and works particularly well when reasonably pure phosphoric acid is available. If, however, the phosphoric acid contains substantial amounts of iron or of aluminum, as is the case with phosphoric acid produced by the acidulation of phosphate rock with sulphuric acid, the operation becomes considerably more difficult. Owing to the fact that solutions of di-ammonium phosphate lose ammonia when concentrated, it is necessary to recover the di-ammonium phosphate by crystallization, and unless the precipitates of iron and aluminum are previously removed, the recovery of the crystalline salt is difficult. The removal of these precipitated iron and aluminum phosphates by filtration or other mechanical means, before crystallization, although feasible, is difficult owing to the gelatinous nature of the precipitates. In addition these precipitates contain phosphoric acid which is available as plant food, so that if the di-ammonium phosphate is intended for fertilizer mixtures the removal of these phosphates lowers the phosphate recovery and consequently adds to the cost of manufacture of the product.

Commercial practice in the manufacture of mono-ammonium phosphate from crude phosphoric acid usually follows the procedure disclosed by Washburn in his United States Patents Nos. 1,142,068, 1,103,115 and 1,100,638, whereby the phosphoric acid is ammoniated only to the mono-state and the resulting solution, containing the iron and aluminum phosphates in suspension, is evaporated to dryness. The process of manufacture according to these patents is simple and the engineering problems are thoroughly worked out; thousands of tons of product are so manufactured annually.

Recognizing the desirability of an ammonia content higher than 13% ammonia, and at the same time desiring to retain the advantages of operation according to the above named processes, I attempted to produce material of higher ammonia content by substantially the same procedure. It would naturally occur to one that di-ammonium phosphate could be produced by ammoniating the phosphoric acid to the di-stage, instead of to the mono-stage as is done in the manufacture of mono-ammonium phosphate, and then evaporate to dryness in exactly the same manner as in the manufacture of the mono-salt. I found, however, that when this procedure was followed the second ammonia was lost in the drying operation and that the product delivered from the dryers was of almost the same composition as that obtained when the ammoniation was carried only to the monostage. It thus became evident that a di-ammonium compound, or, in fact any compound containing substantially more ammonia than the mono-salt could not be produced economically by these older processes.

It next occurred to me that it might be possible to produce a material of higher ammonia content by ammoniating substantially dry mono-ammonium phosphate, for example as produced by the process of Washburn, in solid form. To test this out I placed 100 grams of fertilizer grade mono-ammonium phosphate in a closed container and passed into it substantially dry ammonia gas. I found that the mixture heated up, showing that a chemical reaction was taking place. In my first experiment I succeeded in raising the grade of my product from 13% to 17% ammonia.

The product obtained from my absorber after this ammoniation smelled strongly of ammonia and for this reason would not have been acceptable as a commercial product. Analysis showed, however, that the ratio of ammonia to $P_2O_5$ in the product was not greater than the ratio for di-ammonium phosphate and it was not at first apparent just why the product was not more stable. Further examination showed that the instability was due to the fact that the outside of the particles had been largely converted to tri-ammonium phosphate, while the center of the particles contained unaltered mono-ammonium phosphate. In other words, the distribution of the ammonia upon the granules was not uniform.

I next found that if I stored this material in a closed container for a few hours, for example over night, it lost its ammonia odor although its ammonia content by analysis remained constant. The explanation which I advance for this is that, during the time of storage, the ammonia was enabled to disperse itself uniformly throughout the granules, producing di-ammonium phosphate throughout the entire mixture, the tri-ammonium phosphate on the outside of the particles yielding its excess ammonia to the mono-ammonium phosphate on the inside of the granules. I found also that I could accelerate the uniform distribution of this ammonia by heating the mixture; also that the absorption of the ammonia in the first instance was greatly accelerated by heating the mixture, and in my process I therefore prefer to conduct the absorption operation at temperatures above atmospheric, say in the neighborhood of 100° C. By so conducting the operation I not only speed up the rate of the chemical reaction, but I also minimize formation of tri-ammonium phosphate. I have also found that I can eliminate any last traces of tri-ammonium phosphate or of free ammonia from my product by evacuating the vessel in which the ammoniation or storage of the material takes place, the operation being preferably performed at temperatures above atmospheric.

In the accompanying drawing constituting a part hereof, the single figure is a vertical cross-sectional view of an apparatus adapted for the operation of my invention.

A cylindrical steel vessel 1 is provided with a jacket 2 into which steam from a source 3 is introduced, if necessary, in order to secure the desired temperature on the inside of the jacket, the jacket being provided with an outlet 4 for condensed steam, and the vessel having man-holes 5 for charging and discharging material 6.

An inlet 7 for ammonia gas leads into the vessel 1, which is connected to a source of vacuum 8. A stirrer 9 rotated thru pulley 10 provides means for agitating the contents of vessel 1. In conducting the operation I charge into the shell of the vessel 1 mono-ammonium phosphate in the dry state, for example the product produced by the process of Washburn. I then cause the stirrer 9 to rotate and introduce ammonia gas into the vessel through the inlet 7. Absorption takes place and the introduction of ammonia is continued until an amount has been added estimated to be substantially the amount required for the production of di-ammonium phosphate. The mixture heats up very rapidly at first, but as the operation is continued the temperature tends to fall and I sometimes find it desirable to maintain the temperature of the mixture by supplying heat to the jacket 2 of the reaction vessel by introducing steam at 3. In order to speed up the reaction I may supply the ammonia under pressures higher than atmospheric, for example, at about 60 pounds pressure.

When the required amount of ammonia has been added, I discontinue the addition of ammonia but allow the stirrer to rotate for several hours or at least until the reaction is complete. Finally I may exhaust the air and residual gases from the reaction vessel by use of a vacuum pump in order to remove the last traces of ammonia, both free ammonia and ammonia combined as tri-ammonium phosphate. I then open the apparatus and bag the product for shipment. In physical appearance the ammoniated product resembles the original ammonium phosphate very closely but its ammonia content has been increased. The composition is in the form of a porous granular mass substantially dry to the touch and physically resembling pumice stone when in the form of lumps. It contains in addition to the ammonium phosphate, small quantities of iron and aluminum in the form of phosphates, which are citrate soluble. The amount of ammonia in the product may be varied at will but when the product is made from crude phosphoric acid, I prefer not to exceed an ammonia content of about 20%. Such material contains from 40% to 45% of $P_2O_5$, almost all of which is available as plant food. When pure mono-ammonium phosphate is the starting material the final product analyzes about 25% ammonia and about 50% $P_2O_5$.

One of the important advantages of my process is the flexibility it imparts to the manufacture of fertilizers. Where mono and di-ammonium phosphates are produced by entirely distinct operations it is necessary to stock both materials and it will frequently result that the demands of the market will result in depletion of the stock of one of these materials while the second material is available in large volume. According to my process it is only necessary to produce and stock mono-ammonium phosphate. This may either be shipped out as such or may be converted on a few hours' notice to di-ammonium phosphate as required.

In the claims I have referred to substantially dry mono-ammonium phosphate. By substantially dry mono-ammonium phosphate I mean material sufficiently dry so that it will not become sticky and form agglomerates during the ammoniation.

What I claim is:

1. A method of making an ammonium phosphate composition which comprises treating mono-ammonium phosphate in a substantially dry condition with ammonia.

2. A method of making an ammonium phosphate composition which comprises treating mono-ammonium phosphate in a substantially dry condition with ammonia and allowing the ammonia to remain in contact with the ammonium phosphate for an appreciable length of time.

3. A method of making an ammonium phosphate composition which comprises treating mono-ammonium phosphate in a substantially dry condition with ammonia until the ammonia content of the composition exceeds 15%.

4. A method of making an ammonium phosphate composition which comprises treating mono-ammonium phosphate in a substantially dry condition with ammonia at a temperature above atmospheric.

5. A method of making an ammonium phosphate composition which comprises treating mono-ammonium phosphate in a substantially dry condition with ammonia at a temperature above 60° C.

6. A method of making an ammonium phosphate composition which comprises treating mono-ammonium phosphate in a substantially dry condition with ammonia at a temperature between 60° and 150° C.

7. A method of making an ammonium phosphate composition which comprises treating mono-ammonium phosphate in a substantially dry condition with ammonia at a temperature above atmospheric and at elevated pressure.

In testimony whereof, I have hereunto subscribed my name this 21 day of January, 1927.

GUY H. BUCHANAN.